United States Patent
Lu et al.

(10) Patent No.: US 11,870,500 B2
(45) Date of Patent: Jan. 9, 2024

(54) SIGNAL PROCESSING METHOD AND OPTICAL RECEIVER

(71) Applicant: Huawei Technologies Co., Ltd., Shenzhen (CN)

(72) Inventors: Yanzhao Lu, Dongguan (CN); Yuanda Huang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 148 days.

(21) Appl. No.: 17/645,188

(22) Filed: Dec. 20, 2021

(65) Prior Publication Data

US 2022/0140915 A1 May 5, 2022

Related U.S. Application Data

(63) Continuation of application No. PCT/CN2020/095697, filed on Jun. 12, 2020.

(30) Foreign Application Priority Data

Jun. 21, 2019 (CN) .......................... 201910543765.2

(51) Int. Cl.
  *H04B 10/69* (2013.01)
  *H04L 1/00* (2006.01)
(52) U.S. Cl.
  CPC ....... *H04B 10/6971* (2013.01); *H04L 1/0045* (2013.01)

(58) Field of Classification Search
  CPC .................................................. H04B 10/6971
  See application file for complete search history.

(56) References Cited

U.S. PATENT DOCUMENTS

| 9,537,683 | B1 | 1/2017 | Zamani et al. |
| 2004/0042802 | A1 | 3/2004 | Ho et al. |
| 2013/0287410 | A1 | 10/2013 | Leven et al. |
| 2014/0037291 | A1 | 2/2014 | Yan et al. |
| 2015/0139641 | A1 | 5/2015 | Feder et al. |
| 2016/0323091 | A1* | 11/2016 | Inoue ................. H04B 10/6164 |
| 2017/0048004 | A1* | 2/2017 | Liu .................... H04L 25/03993 |
| 2018/0019814 | A1 | 1/2018 | Fludger et al. |
| 2018/0034552 | A1 | 2/2018 | Oyama et al. |

FOREIGN PATENT DOCUMENTS

| CN | 1496107 A | 5/2004 |
| CN | 101834825 A | 9/2010 |
| CN | 107888250 A | 4/2018 |
| CN | 109450553 A | 3/2019 |
| EP | 3131247 A1 | 2/2017 |

* cited by examiner

*Primary Examiner* — Shi K Li
(74) *Attorney, Agent, or Firm* — Slater Matsil, LLP

(57) ABSTRACT

An optical receiver obtains a to-be-processed signal block; the optical receiver determines a prediction signal block corresponding to the to-be-processed signal block; the optical receiver determines a noise compensation coefficient of the to-be-processed signal block based on the to-be-processed signal block and the prediction signal block; and the optical receiver performs noise compensation on the to-be-processed signal block based on the noise compensation coefficient.

20 Claims, 4 Drawing Sheets

SIGNAL PROCESSING METHOD AND OPTICAL RECEIVER

CROSS-REFERENCE TO RELATED APPLICATIONS

This application is a continuation of international No. PCT/CN2020/095697, filed on Jun. 12, 2020, which claims priority to Chinese Patent Application No. 201910543765.2, filed on Jun. 21, 2019. The disclosures of the aforementioned applications are hereby incorporated by reference in their entireties.

TECHNICAL FIELD

This application relates to communications technologies, and in particular, to a signal processing method and an optical receiver.

BACKGROUND

With increasing development of mobile Internet needs, 4K/8K video technologies and virtual reality (VR) video technologies continuously develop. Therefore, larger-capacity optical transmission networks and better transmission quality need to be provided to meet ever-increasing user needs.

Currently, in an optical communications network, to increase an optical transmission rate, a single-wave transmission rate is increased by using a higher order modulation format and a higher symbol rate. For example, in a 100G/200G wavelength division multiplexing (WDM) transmission system, the single-wave transmission rate is modulated to 400 Gbps. However, due to a limitation of nonlinear transmission of an optical fiber, an incoming fiber power of an optical signal cannot be greatly increased. Therefore, a signal-to-noise ratio of a signal received by an optical receiver is limited, that is, the signal-to-noise ratio of the signal is relatively small, and a transmission distance of the optical signal is limited. Therefore, transmission performance of a current optical communications network cannot meet large-capacity and long-distance transmission requirements at the same time.

SUMMARY

Embodiments of this application provide a signal processing method and an optical receiver, used to perform noise compensation on a to-be-processed signal block, so as to increase a signal-to-noise ratio of a signal.

A first aspect of the embodiments of this application provides a signal processing method, including the following.

An optical receiver obtains a to-be-processed signal block; and the optical receiver determines a prediction signal block corresponding to the to-be-processed signal block, then determines a noise compensation coefficient of the to-be-processed signal block based on the to-be-processed signal block and the prediction signal block, and performs noise compensation on the to-be-processed signal block based on the noise compensation coefficient. In this embodiment, under noise interference, there is a correlation between symbols included in the to-be-processed signal block. Therefore, the noise compensation coefficient generated by the optical receiver based on the to-be-processed signal block and the prediction signal block can indicate the correlation between the symbols included in the to-be-processed signal block. Then, noise compensation for the to-be-processed signal block can be implemented by using the noise compensation coefficient, so as to increase a signal-to-noise ratio of a signal, and meet large-capacity and long-distance transmission performance requirements of an optical communications network.

In a possible implementation, the noise compensation coefficient indicates a correlation between symbols included in the to-be-processed signal block under noise interference. In this embodiment, the noise compensation coefficient can reflect a correlation between to-be-processed signal blocks, and therefore, noise compensation for the to-be-processed signal block can be implemented by using the noise compensation coefficient.

In another possible implementation, that the optical receiver determines a prediction signal block corresponding to the to-be-processed signal block includes: The optical receiver processes the to-be-processed signal block by using any one of a preset determining manner, a preset training sequence, and forward error correction (FEC), to obtain the prediction signal block. In this possible implementation, several implementation means for determining the prediction signal block by the optical receiver are provided.

In another possible implementation, the to-be-processed signal block includes $R_1$ to $R_n$, and $R_1$ to $R_n$ are n symbols transmitted in a time sequence, where n is an integer greater than or equal to 2; and that the optical receiver determines a noise compensation coefficient based on the to-be-processed signal block and the prediction signal block includes: First, the optical receiver obtains $R_{n+1}$ to $R_{n+m-1}$, where $R_{n+1}$ to $R_{n+m-1}$ are m−1 symbols following $R_n$ that are transmitted in a time sequence; then, the optical receiver determines a first matrix and a second matrix, where the first matrix is [$S_1$ $S_2$ ... $S_n$], the second matrix is $$\begin{bmatrix} R_1 & R_2 & R_3 & \cdots & \cdots & R_n \\ R_2 & R_3 & R_4 & \cdots & \cdots & R_{n+1} \\ R_3 & & & & & \\ \cdots & & & \cdots & & \\ R_m & & & & & R_{n+m-1} \end{bmatrix},$$

$S_1$ to $S_n$ are n symbols included in the prediction signal block and transmitted in a time sequence, and each column of the second matrix includes an initial symbol of the column and m−1 symbols related to the initial symbol in the to-be-processed signal block, where n is greater than m, and m is an integer greater than 1; and the optical receiver multiplies the first matrix by an inverse matrix of the second matrix to obtain a noise compensation matrix including the noise compensation coefficient, where the noise compensation matrix is [$h_1$, $h_2$ ... $h_m$]. In this possible implementation, a specific manner of determining the noise compensation coefficient by the optical receiver is provided.

In another possible implementation, the to-be-processed signal block includes $X_1$ to $X_n$ and $Y_1$ to $Y_n$, $X_1$ to $X_n$ are n symbols transmitted in a time sequence in a first polarization signal, and $Y_1$ to $Y_n$ are n symbols transmitted in a time sequence in a second polarization signal, where n is an integer greater than or equal to 2; and that the optical receiver determines the noise compensation coefficient based on the to-be-processed signal block and the prediction signal block includes: First, the optical receiver obtains $X_{n+1}$ to $X_{n+i-1}$ and $Y_{n+1}$ to $Y_{n+j-1}$, where $X_{n+1}$ to $X_{n+i-1}$ are i−1 symbols following $X_n$ that are transmitted in a time sequence in the first polarization signal, $Y_{n+1}$ to $Y_{n+j-1}$ are j−1 symbols following $Y_n$ that are transmitted in a time sequence in the second polarization signal; then, the optical receiver determines a first matrix and a second matrix, where the first matrix is $[S_1\ S_2\ \ldots\ S_n]$, the second matrix is $$\begin{bmatrix} X_1 & X_2 & X_3 & \ldots & \ldots & X_n \\ X_2 & X_3 & X_4 & & & X_{n+1} \\ \ldots & & \ldots & & & \\ X_i & \ldots & & & & X_{n+i-1} \\ Y_1 & Y_2 & Y_3 & \ldots & \ldots & Y_n \\ Y_2 & Y_3 & \ldots & & & \\ \ldots & & \ldots & & & \\ Y_j & & & & & Y_{n+j-1} \end{bmatrix},$$

$S_1$ to $S_n$ are n symbols included in the prediction signal block and transmitted in a time sequence, each column of the second matrix includes an initial symbol of the column, i−1 symbols related to the initial symbol in the first polarization signal, the $(i+1)^{th}$ symbol of the column, and j−1 symbols related to the $(i+_1)^{th}$ symbol in the second polarization signal, where n is greater than i+j, i is an integer greater than 1, and j is an integer greater than 1; and the optical receiver multiplies the first matrix by an inverse matrix of the second matrix to obtain a noise compensation matrix including the noise compensation coefficient, where the noise compensation matrix is $[h_1, h_2 \ldots h_m]$ In this possible implementation, a specific manner of determining the noise compensation coefficient of dual polarization signals is provided.

A second aspect of the embodiments of this application provides an optical receiver, where the optical receiver includes: a processing module, configured to obtain a to-be-processed signal block; where the processing module is further configured to: determine a prediction signal block corresponding to the to-be-processed signal block; determine a noise compensation coefficient of the to-be-processed signal block based on the to-be-processed signal block and the prediction signal block; and perform noise compensation on the to-be-processed signal block based on the noise compensation coefficient.

In a possible implementation, the noise compensation coefficient indicates a correlation between symbols included in the to-be-processed signal block under noise interference.

In another possible implementation, the processing module is specifically configured to: process the to-be-processed signal block by using any one of a preset determining manner, a preset training sequence, and FEC to obtain the prediction signal block.

In another possible implementation, the to-be-processed signal block includes $R_1$ to $R_n$, and $R_1$ to $R_n$ are n symbols transmitted in a time sequence, where n is an integer greater than or equal to 2; and the processing module is specifically configured to: obtain $R_{n+1}$ to $R_{n+m-1}$, where $R_{n+1}$ to $R_{n+m-1}$ are m−1 symbols following $R_n$ that are transmitted in a time sequence; determine a first matrix and a second matrix, where the first matrix is $[S_1\ S_2\ \ldots\ S_n]$, the second matrix is $$\begin{bmatrix} R_1 & R_2 & R_3 & \ldots & \ldots & R_n \\ R_2 & R_3 & R_4 & \ldots & \ldots & R_{n+1} \\ R_3 & & \ldots & & & \\ \ldots & & \ldots & & & \\ R_m & & & & & R_{n+m-1} \end{bmatrix},$$

and $S_1$ to $S_n$ are n symbols included in the prediction signal block and transmitted in a time sequence; and each column of the second matrix includes an initial symbol of the column and m−1 symbols related to the initial symbol in the to-be-processed signal block, where n is greater than m, and m is an integer greater than 1; and multiply the first matrix by an inverse matrix of the second matrix, to obtain a noise compensation matrix including the noise compensation coefficient, where the noise compensation matrix is $[h_1, h_2 \ldots h_m]$.

In another possible implementation, the to-be-processed signal block includes $X_1$ to $X_n$ and $Y_1$ to $Y_n$, where $X_1$ to $X_n$ are n symbols transmitted in a time sequence in a first polarization signal, and $Y_1$ to $Y_n$ are n symbols transmitted in a time sequence in a second polarization signal, where n is an integer greater than or equal to 2; and the processing module is specifically configured to: obtain $X_{n+1}$ to $X_{n+i-1}$ and $Y_{n+1}$ to $Y_{n+j-1}$, where $X_{n+1}$ to $X_{n+i-1}$ are i−1 symbols following $X_n$ that are transmitted in a time sequence in the first polarization signal, and $Y_{n+1}$ to $Y_{n+j-1}$ are j−1 symbols following $Y_n$ that are transmitted in a time sequence in the second polarization signal; determine a first matrix and a second matrix, where the first matrix is $[S_1\ S_2\ \ldots\ S_n]$, the second matrix is $$\begin{bmatrix} X_1 & X_2 & X_3 & \ldots & \ldots & X_n \\ X_2 & X_3 & X_4 & & & X_{n+1} \\ \ldots & & \ldots & & & \\ X_i & \ldots & & & & X_{n+i-1} \\ Y_1 & Y_2 & Y_3 & \ldots & \ldots & Y_n \\ Y_2 & Y_3 & \ldots & & & \\ \ldots & & \ldots & & & \\ Y_j & & & & & Y_{n+j-1} \end{bmatrix},$$

and $S_1$ to $S_n$ are n symbols included in the prediction signal block and transmitted in a time sequence; and each column of the second matrix includes an initial symbol of the column, i−1 symbols related to the initial symbol in the first polarization signal, the $(i+1)^{th}$ symbol of the column, and j−1 symbols related to the $(i+1)^{th}$ symbol in the second polarization signal, where n is greater than i+j, i is an integer greater than 1, and j is an integer greater than 1; and multiply the first matrix by an inverse matrix of the second matrix, to obtain a noise compensation matrix including the noise compensation coefficient, where the noise compensation matrix is $[h_1, h_2 \ldots h_m]$.

A third aspect of the embodiments of this application provides an optical receiver, where the optical receiver includes a processor and a memory; the memory stores computer instructions; and when executing the computer instructions in the memory, the processor is configured to implement any implementation of the first aspect.

A fourth aspect of the embodiments of this application provides a chip system, where the chip system includes at least one processor and a memory, the memory stores instructions, and the at least one processor is configured to perform the operation of the optical receiver in any implementation of the first aspect of this application.

In a possible implementation, the chip system further includes a transceiver, and the transceiver is interconnected with the at least one processor through a line.

A fifth aspect of the embodiments of this application provides a computer program product including instructions, where when the computer program product is run on a computer, the computer is enabled to execute any implementation of the first aspect.

A sixth aspect of the embodiments of this application provides a computer-readable storage medium including instructions, where when the instructions are run on a computer, the computer is enabled to execute any implementation of the first aspect.

It can be learned from the foregoing technical solutions that the embodiments of this application have the following advantages.

It can be learned from the foregoing technical solutions that an optical receiver obtains a to-be-processed signal block; and the optical receiver determines a prediction signal block corresponding to the to-be-processed signal block, then determines a noise compensation coefficient of the to-be-processed signal block based on the to-be-processed signal block and the prediction signal block, and performs noise compensation on the to-be-processed signal block based on the noise compensation coefficient. Under noise interference, there is a correlation between symbols included in the to-be-processed signal block. Therefore, the noise compensation coefficient generated by the optical receiver based on the to-be-processed signal block and the prediction signal block can indicate the correlation between the symbols included in the to-be-processed signal block. Then, noise compensation for the to-be-processed signal block can be implemented by using the noise compensation coefficient, so as to increase a signal-to-noise ratio of a to-be-processed signal, and meet large-capacity and long-distance transmission performance requirements of an optical communications network.

DETAILED DESCRIPTION OF ILLUSTRATIVE EMBODIMENTS

Embodiments of this application provide a signal processing method and an optical receiver, used to perform noise compensation on a to-be-processed signal block, so as to increase a signal-to-noise ratio of a signal.

Figure 1:
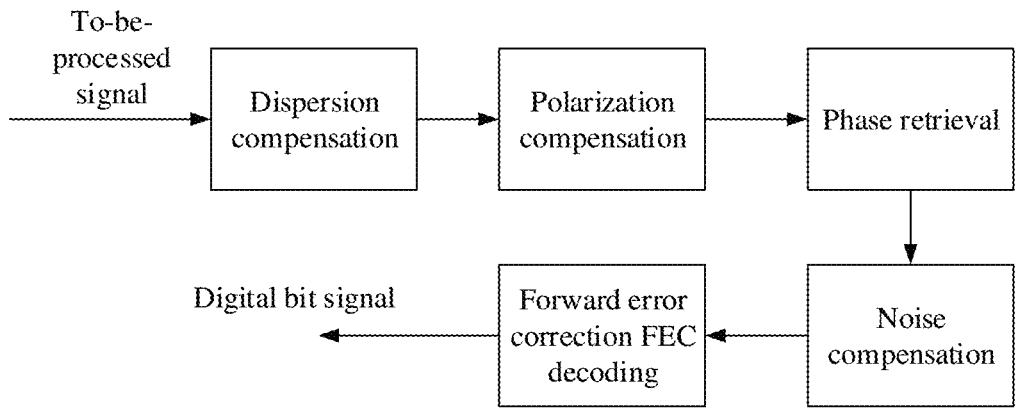
FIG. 1 is a schematic diagram of a system framework according to an embodiment of this application.

To increase a signal-to-noise ratio of a signal, so as to meet large-capacity and long-distance transmission performance requirements of an optical communications network, an optical receiver performs noise compensation on a received to-be-processed signal. FIG. 1 is a schematic diagram of a system framework according to an embodiment of this application. An optical receiver obtains a to-be-processed signal, where the to-be-processed signal is a digital electrical signal obtained by performing analog-to-digital conversion on an analog electrical signal, and the analog electrical signal is an analog electrical signal obtained by performing optical-to-electrical conversion on an optical signal sent by an optical transmitter. Specifically, an operation of performing optical-to-electrical conversion processing on the optical signal and an operation of performing analog-to-digital conversion processing on the analog signal may be performed by the optical receiver, or may be performed by another external device. This is not specifically limited herein. Because of dispersion of a fiber link, the optical receiver performs dispersion compensation on the to-be-processed signal, performs phase retrieval on the to-be-processed signal, performs noise compensation on the to-be-processed signal by using a noise compensation coefficient, and decodes, through FEC, digital symbols output after noise compensation to obtain a digital bit signal.

It should be noted that FIG. 1 is merely an example. In actual application, after obtaining the to-be-processed signal, the optical receiver may directly perform noise compensation on the to-be-processed signal, and then decode, through FEC, the digital symbols output after noise compensation. Three processing processes: dispersion compensation, polarization compensation, and phase retrieval are optional processing processes, and may be performed before the noise compensation processing process, or may be performed after the noise compensation processing process. This is not specifically limited in this application.

Figure 2A:
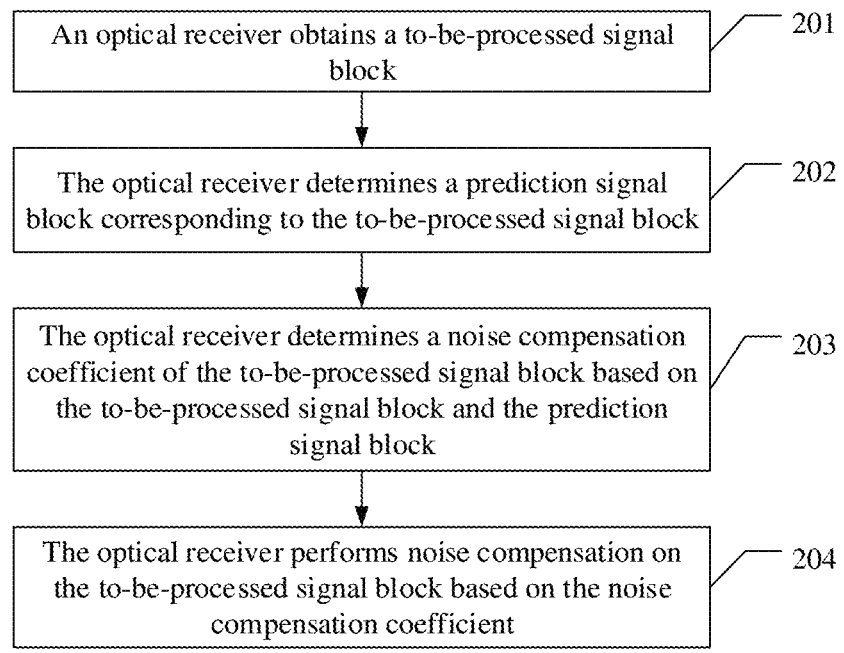
FIG. 2A is a schematic diagram of an embodiment of a signal processing method according to an embodiment of this application.

The following describes in detail, by using FIG. 2A, a process in which the optical receiver performs noise compensation on the to-be-processed signal in this embodiment of this application. Refer to FIG. 2A. An embodiment of a signal processing method according to an embodiment of this application includes the following steps.

201: The optical receiver obtains a to-be-processed signal block.

The to-be-processed signal block includes n symbols transmitted in a time sequence in the to-be-processed signal, n is an integer greater than or equal to 2, and a value of n is related to noise intensity in an optical communications network that transmits the to-be-processed signal. For example, higher noise intensity in the optical communications network causes a larger value of n. It should be noted that the to-be-processed signal may come from a same polarization signal, or may come from a plurality of different polarization signals. This is not specifically limited in this application.

In this embodiment of this application, the to-be-processed signal block refers to a signal block obtained through analog-to-digital conversion processing. It should be noted that the to-be-processed signal block obtained by the optical receiver may be a to-be-processed signal block that is obtained through analog-to-digital conversion processing and that is sent by an external device to the optical receiver, or may be a to-be-processed signal block that is obtained by performing analog-to-digital conversion on a received signal block by the optical receiver. This is not specifically limited in this application.

Figure 2B:
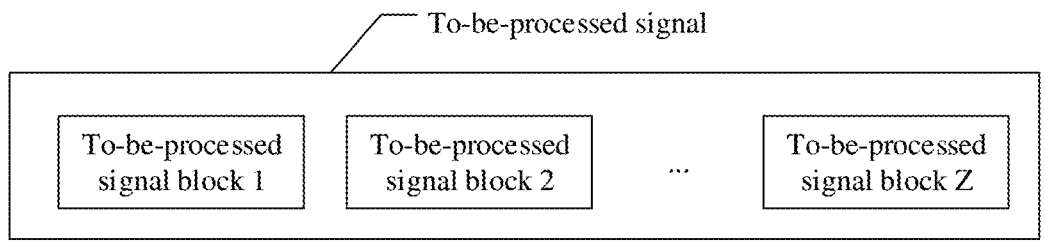
FIG. 2B is a schematic structural diagram of a to-be-processed signal according to an embodiment of this application.

The following first describes a transmission structure of a to-be-processed signal. FIG. 2B is a schematic structural diagram of a to-be-processed signal. The to-be-processed signal includes a plurality of to-be-processed signal blocks. For example, the to-be-processed signal includes Z to-be-processed signal blocks: a to-be-processed signal block 1, a to-be-processed signal block 2, . . . , and a to-be-processed signal block Z, where Z is a positive integer greater than or equal to 1. If a length of the to-be-processed signal block is n, the to-be-processed signal block includes n symbols transmitted in a time sequence. Specifically, refer to FIG. 2C. A length of a to-be-processed signal block is n, and the to-be-processed signal block includes n symbols transmitted in a time sequence, where the n symbols are $R_1$, $R_2$, . . . , and $R_n$. For example, $R_1$ is the first symbol of the to-be-processed signal block, and $R_n$ is the $n^{th}$ symbol of the to-be-processed signal block.

It should be noted that lengths of to-be-processed signal blocks included in the to-be-processed signal may be the same or different. This is not specifically limited in this application. In actual application, a length of a to-be-processed signal block may be set based on noise intensity in a current optical communications network.

202: The optical receiver determines a prediction signal block corresponding to the to-be-processed signal block.

Figure 2C:
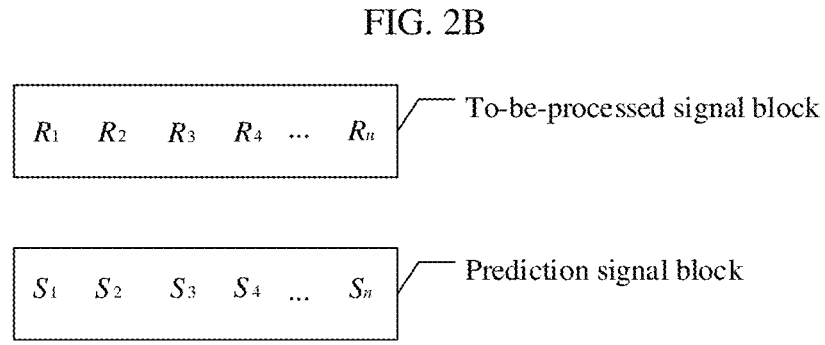
FIG. 2C is a schematic structural diagram of a to-be-processed signal block according to an embodiment of this application.

As shown in FIG. 2C, the to-be-processed signal is referred to as R, and the to-be-processed signal block includes n symbols transmitted in a time sequence in the to-be-processed signal R, where the n symbols are $R_1$ to $R_n$. A prediction signal S is a to-be-processed signal that is obtained through prediction based on the to-be-processed signal block and that is almost not affected by noise. The prediction signal block includes n symbols transmitted in a time sequence in the prediction signal S, where the n symbols are $S_1$ to $S_n$. Optionally, in this embodiment of this application, there are a plurality of manners of determining the prediction signal block corresponding to the to-be-processed signal block by the optical receiver. The following provides examples for description.

1. The optical receiver processes the to-be-processed signal block in a preset determining manner to obtain the prediction signal block.

For example, the optical receiver performs determining on the to-be-processed signal block in a quadrature phase shift keying (QPSK) modulation code type manner, so as to obtain the prediction signal block. Two bits are mapped in the QPSK modulation code type manner, and correspond to four combinations: 00, 01, 10, and 11. For example, when it is determined that a symbol in the to-be-processed signal block falls into a first quadrant, a combination corresponding to the first quadrant is 11, and the optical receiver may determine that a prediction symbol in the prediction signal block is 1+1j.

2. The optical receiver processes the to-be-processed signal block by using a preset training sequence to obtain the prediction signal block.

The to-be-processed signal carries a preset training sequence inserted into the to-be-processed signal block by an optical transmitter, and the optical receiver determines a specific location and modulation information of the preset training sequence in the to-be-processed signal block, so as to obtain the prediction signal block. For example, the first five symbols in the to-be-processed signal block are the preset training sequence, and the optical receiver may obtain the prediction signal block through calculation by using the five symbols.

3. The optical receiver processes the to-be-processed signal block in an FEC manner to obtain the prediction signal block.

Figure 2D:
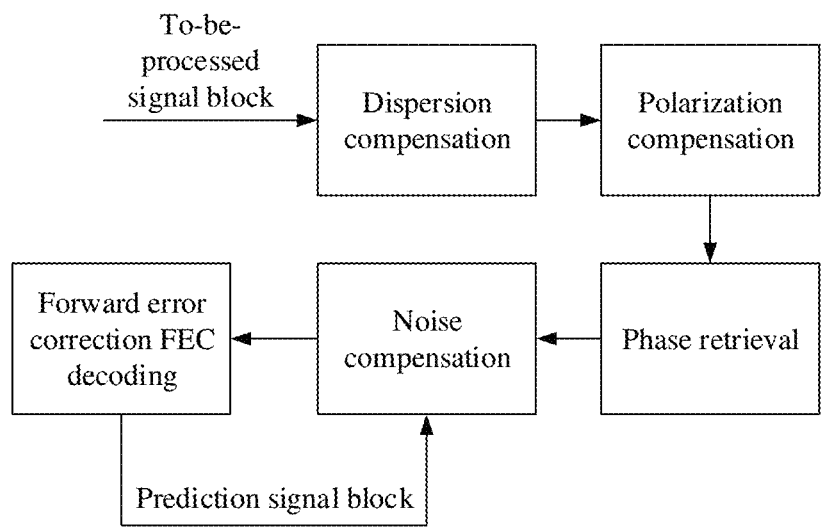
FIG. 2D is a schematic flowchart of a signal processing method according to an embodiment of this application.

For example, as shown in FIG. 2D, a module that performs noise compensation processing in the optical receiver stores the to-be-processed signal block, and then sends the to-be-processed signal block to an FEC module in the optical receiver. The FEC module performs FEC decoding on the to-be-processed signal block to obtain the prediction signal block, and returns the prediction signal block to the module that performs noise compensation processing. Before the optical receiver sends the to-be-processed signal block to the FEC module by using the module that performs noise compensation processing, the optical receiver may further perform dispersion compensation, polarization compensation, and phase retrieval processing on the to-be-processed signal block.

203: The optical receiver determines a noise compensation coefficient of the to-be-processed signal block based on the to-be-processed signal block and the prediction signal block.

The noise compensation coefficient indicates a correlation between symbols included in the to-be-processed signal block. It should be noted that each to-be-processed signal block has a corresponding prediction signal block. Therefore, each to-be-processed signal block has a corresponding noise compensation coefficient. For example, as shown in FIG. 2B, a noise compensation coefficient of the to-be-processed signal block 1 is A, and noise compensation coefficient of the to-be-processed signal block 2 is B.

Specifically, the to-be-processed signal in this embodiment of this application may come from a same polarization signal, or may come from a plurality of different polarization signals. For the two cases, processes in which the optical receiver determines the noise compensation coefficient of the to-be-processed signal block are respectively described in detail in the following embodiments shown in FIG. 3 and FIG. 4.

204: The optical receiver performs noise compensation on the to-be-processed signal block based on the noise compensation coefficient.

In a possible implementation, the optical receiver multiplies the to-be-processed signal block by the noise compensation coefficient to obtain a compensated signal block.

In this embodiment of this application, an optical receiver obtains a to-be-processed signal block; and the optical receiver determines a prediction signal block corresponding to the to-be-processed signal block, then determines a noise compensation coefficient of the to-be-processed signal block based on the to-be-processed signal block and the prediction signal block, and performs noise compensation on the to-be-processed signal block based on the noise compensation coefficient. Under noise interference, there is a correlation between symbols included in the to-be-processed signal block. Therefore, the noise compensation coefficient generated by the optical receiver based on the to-be-processed signal block and the prediction signal block can indicate the correlation between the symbols included in the to-be-processed signal block. Then, noise compensation for the to-be-processed signal block can be implemented by using the noise compensation coefficient, so as to increase a signal-to-noise ratio of a signal, and meet large-capacity and long-distance transmission performance requirements of an optical communications network.

Figure 3:
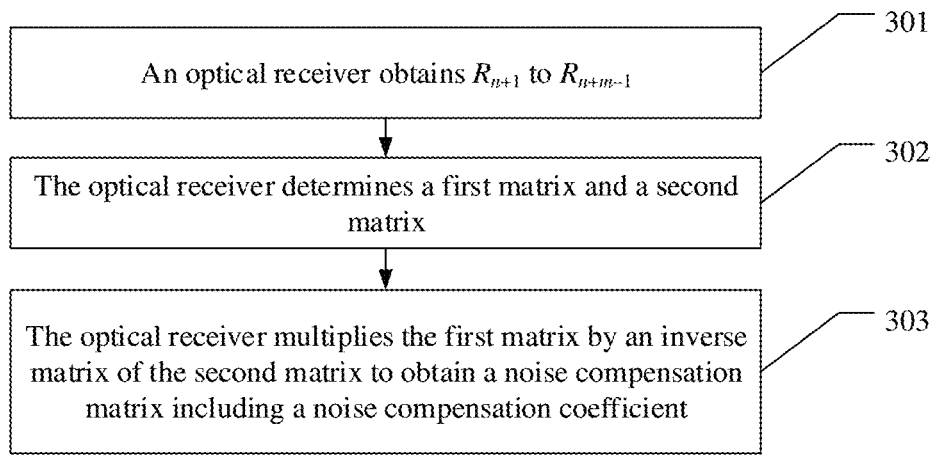
FIG. 3 is a schematic diagram of another embodiment of a signal processing method according to an embodiment of this application.

First, refer to FIG. 3. A to-be-processed signal comes from a same polarization signal, the to-be-processed signal is referred to as R herein, and a prediction signal corresponding to the to-be-processed signal is referred to as S. A specific process of determining a noise compensation coefficient by an optical receiver includes the following steps.

301: The optical receiver obtains $R_{n+1}$ to $R_{n+m-1}$.

$R_{n+1}$ to $R_{n+m-1}$ are m−1 symbols arranged after a symbol $R_n$ in the to-be-processed signal R in a time sequence.

It should be noted that, $R_{n+1}$ to $R_{n+m-1}$ may be symbols on another to-be-processed signal block transmitted after the to-be-processed signal block, or may be symbols on several other to-be-processed signal blocks transmitted after the to-be-processed signal block. Specifically, locations of the symbols are determined based on a length of a signal block. For example, as shown in FIG. 2B, $R_1$ to $R_n$ are symbols on the to-be-processed signal block 1, and if a length of the to-be-processed signal block 2 is greater than or equal to m, $R_{n+1}$ to $R_{n+m-1}$ are symbols on the to-be-processed signal block 2; and if the length of the to-be-processed signal block 2 is less than m, $R_{n+1}$ to $R_{n+m-1}$ may be distributed on the to-be-processed signal block 2 and a to-be-processed signal block 3, and may even be distributed on a to-be-processed signal block 4. Specifically, locations of the symbols are determined based on a length of a signal block.

302: The optical receiver determines a first matrix and a second matrix.

The to-be-processed signal block includes n symbols transmitted in a time sequence in the to-be-processed signal R, where the n symbols are $R_1$ to $R_n$. Similarly, a prediction signal block corresponding to the to-be-processed signal block includes n symbols transmitted in a time sequence in the prediction signal S, where the n symbols are $S_1$ to $S_n$. Then, the first matrix may be $[S_1\ S_2\ \ldots\ S_n]$ In addition, the optical receiver may arrange the second matrix as $$\begin{bmatrix} R_1 & R_2 & R_3 & \ldots & \ldots & R_n \\ R_2 & R_3 & R_4 & \ldots & \ldots & R_{n+1} \\ R_3 & \ldots & & & & \\ \ldots & & \ldots & & & \\ R_m & & & & & R_{n+m-1} \end{bmatrix}.$$

Each column of the second matrix includes an initial symbol of the column and m−1 symbols related to the initial symbol in the to-be-processed signal block, where n is greater than m, m is an integer greater than 1, and n is an integer greater than or equal to 2.

Because of noise interference of an optical communications network, there is a correlation between symbols included in a to-be-processed signal block, and higher noise intensity causes a stronger correlation between the symbols, a wider symbol correlation range, and a larger value of m. For example, it may be learned from the second matrix that the initial symbol of the first column of the matrix is $R_1$, and $R_2$ to $R_m$ are m−1 symbols that are related to $R_1$ and that are transmitted in a time sequence and arranged after $R_1$.

303: The optical receiver multiplies the first matrix by an inverse matrix of the second matrix to obtain a noise compensation matrix including a noise compensation coefficient.

The noise compensation matrix is $$[h_1, h_2 \ldots h_m] = [S_1\ S_2\ \ldots\ S_n] * pinv\left\{\begin{bmatrix} R_1 & R_2 & R_3 & \ldots & \ldots & R_n \\ R_2 & R_3 & R_4 & \ldots & \ldots & R_{n+1} \\ R_3 & & \ldots & & & \\ \ldots & & \ldots & & & \\ R_m & & & & & R_{n+m-1} \end{bmatrix}\right\},$$

and a function pinv{a} means inverting a matrix a.

With reference to step 204 shown in FIG. 2A, when the to-be-processed signal comes from a same polarization signal, a signal block obtained through noise compensation is $$[h_1, h_2 \ldots h_m] * \begin{bmatrix} R_1 & R_2 & R_3 & \ldots & \ldots & R_n \\ R_2 & R_3 & R_4 & \ldots & \ldots & R_{n+1} \\ R_3 & & \ldots & & & \\ \ldots & & \ldots & & & \\ R_m & & & & & R_{n+m-1} \end{bmatrix}.$$

Figure 4:
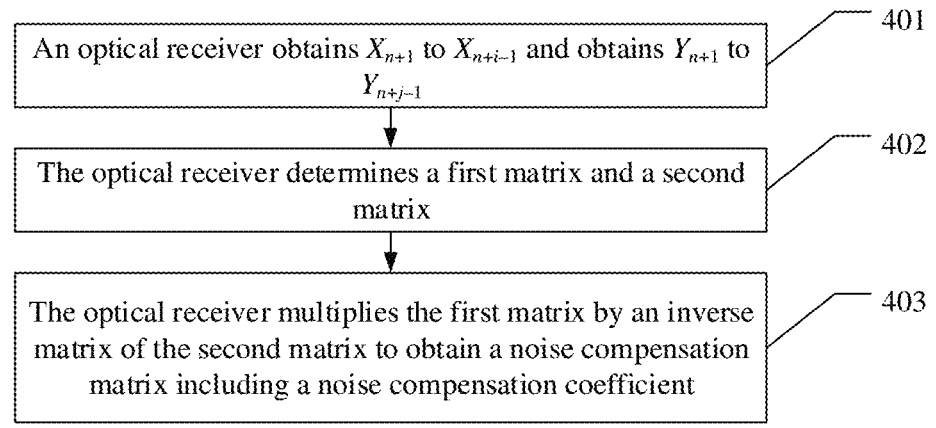
FIG. 4 is a schematic diagram of another embodiment of a signal processing method according to an embodiment of this application.

Refer to FIG. 4. A to-be-processed signal includes polarization signals in a plurality of different polarization directions. Herein, an example in which the to-be-processed signal includes polarization signals in two polarization directions is used for description. To be specific, the to-be-processed signal includes a first polarization signal X and a second polarization signal Y. A prediction signal corresponding to the to-be-processed signal is referred to as S. A specific process of determining a noise compensation coefficient by an optical receiver includes the following steps.

401: The optical receiver obtains $X_{n+1}$ to $X_{n+i-1}$ and $Y_{n+1}$ to $Y_{n+j-1}$.

$X_{n+1}$ to $X_{n+i-1}$ are i−1 symbols arranged after a symbol $X_n$ in the first polarization signal X in a time sequence, and $Y_{n+1}$ to $Y_{n+j-1}$ are j−1 symbols arranged after a symbol $Y_n$ in the second polarization signal Y in a time sequence.

It should be noted that, $X_{n+1}$ to $X_{n+i-1}$ may be symbols on another to-be-processed signal block transmitted after the to-be-processed signal block, or may be symbols on several other to-be-processed signal blocks transmitted after the to-be-processed signal block. Specifically, locations of the symbols are determined based on a length of a signal block. Similarly, $Y_{n+1}$ to $Y_{n+j-1}$ may be symbols on another to-be-processed signal block transmitted after the to-be-processed signal block, or may be symbols on several other to-be-processed signal blocks transmitted after the to-be-processed signal block.

402: The optical receiver determines a first matrix and a second matrix.

The to-be-processed signal block includes n symbols of the first polarization signal X and n symbols of the second polarization signal Y, which respectively include $X_1$ to $X_n$ and $Y_1$ to $Y_n$. Similarly, a prediction signal block corresponding to the to-be-processed signal block includes n symbols transmitted in a time sequence, where the n symbols are $S_1$ to $S_n$. Then, the first matrix is $[S_1\ S_2\ \ldots\ S_n]$.

In addition, the optical receiver may arrange the second matrix as $$\begin{bmatrix} X_1 & X_2 & X_3 & \ldots & \ldots & X_n \\ X_2 & X_3 & X_4 & & & X_{n+1} \\ \ldots & & \ldots & & & \\ X_i & \ldots & & & & X_{n+1-1} \\ Y_1 & Y_2 & Y_3 & \ldots & \ldots & Y_n \\ Y_2 & Y_3 & \ldots & & & \\ \ldots & & \ldots & & & \\ Y_j & & & & & Y_{n+j-1} \end{bmatrix}.$$

Each column of the second matrix includes an initial symbol of the column, i−1 symbols that are related to the initial symbol in the first polarization signal X and that are arranged after the initial symbol in a time sequence, the $(i+1)^{th}$ symbol of the column, and j−1 symbols that are related to the (i+1)$^{th}$ symbol in the second polarization signal Y and that are arranged after the (i+1)$^{th}$ symbol in a time sequence, where n is greater than i+j, i is an integer greater than 1, and j is an integer greater than 1.

The optical receiver may obtain values of i and j based on at least one of the following factors:

1. Noise intensity in an optical communications network that transmits the to-be-processed signal block.

Because of noise interference of the optical communications network, there is a correlation between symbols included in the to-be-processed signal block. For the first polarization signal X, when noise intensity in the optical communications network is higher, a correlation between symbols included in the first polarization signal X is stronger, a symbol correlation range is wider, and the value of i is larger. Similarly, for the second polarization signal Y, when the noise intensity in the optical communications network is higher, the value of j is larger.

2. Noise intensity of cross-phase noise generated between the first polarization signal X and the second polarization signal Y Cross-phase noise may occur between the first polarization signal X and the second polarization signal Y in a transmission process. If noise intensity of the cross-phase noise is higher, a correlation between the first polarization signal X and the second polarization signal Y is stronger, a symbol correlation range is also wider, and the values of i and j are larger.

403: The optical receiver multiplies the first matrix by an inverse matrix of the second matrix to obtain a noise compensation matrix including a noise compensation coefficient.

The noise compensation matrix is $$[H_1, h_2 \ldots h_m] = [S_1\ S_2\ \ldots\ S_n] * pinv\left\{\begin{bmatrix} X_1 & X_2 & X_3 & \ldots & \ldots & X_n \\ X_2 & X_3 & X_4 & & & X_{n+1} \\ \ldots & & & \ldots & & \\ X_i & \ldots & & & & X_{n+1-1} \\ Y_1 & Y_2 & Y_3 & \ldots & \ldots & Y_n \\ Y_2 & Y_3 & \ldots & & & \\ \ldots & & & \ldots & & \\ Y_j & & & & & Y_{n+j-1} \end{bmatrix}\right\},$$

and a function pinv{a} means inverting a matrix a.

With reference to step 204 shown in FIG. 2A, when the to-be-processed signal comes from a plurality of different polarization signals, for example, comes from two polarization signals, a signal block obtained through noise compensation is performed on the to-be-processed signal block is $$[h_1, h_2 \ldots h_m] * \begin{bmatrix} X_1 & X_2 & X_3 & \ldots & \ldots & X_n \\ X_2 & X_3 & X_4 & & & X_{n+1} \\ \ldots & & & \ldots & & \\ X_i & \ldots & & & & X_{n+1-1} \\ Y_1 & Y_2 & Y_3 & \ldots & \ldots & Y_n \\ Y_2 & Y_3 & \ldots & & & \\ \ldots & & & \ldots & & \\ Y_j & & & & & Y_{n+j-1} \end{bmatrix}.$$

Figure 5:
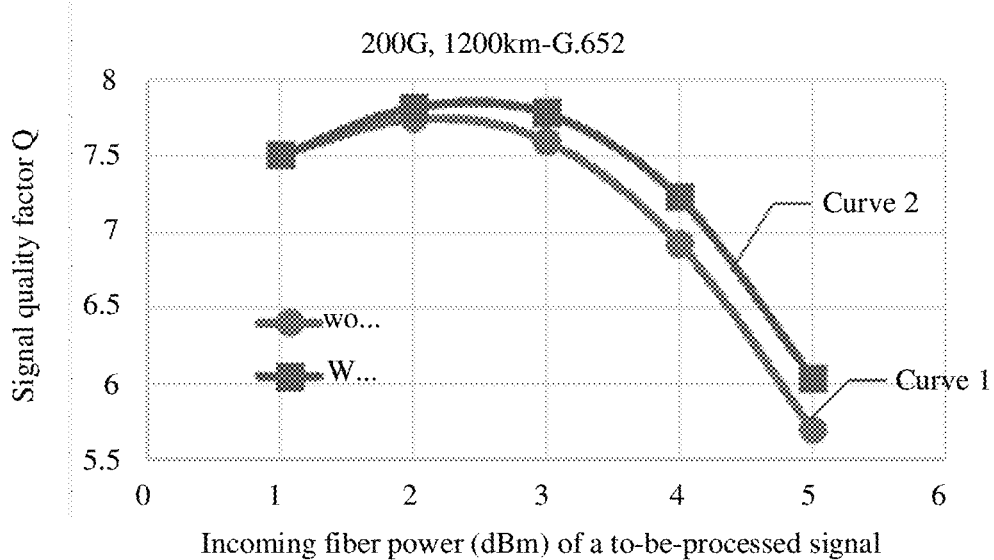
FIG. 5 is a schematic diagram of transmission of 200G-16QAM dual polarization signals in a 1200-kilometer (km) optical fiber network according to an embodiment of this application.

For example, FIG. 5 is a schematic diagram of transmission of 200G-16QAM dual polarization signals in a 1200-kilometer (km) optical fiber network. A horizontal coordinate is an incoming fiber power of a to-be-processed signal, a vertical coordinate represents a signal quality factor Q that represents signal quality, a curve 1 represents a signal on which no noise compensation is performed and received by an optical receiver, and a curve 2 represents a signal obtained through noise compensation is performed according to the signal processing method in the embodiment of this application. It can be seen from FIG. 5 that, compared with Q of the signal on which no noise compensation is performed, a signal quality factor Q of the signal obtained through noise compensation is larger, and it can be learned that signal quality of the signal obtained through noise compensation is better. Experimental data indicates that a power of the signal obtained through noise compensation can be increased by up to 0.4 decibels (dB).

Figure 6:
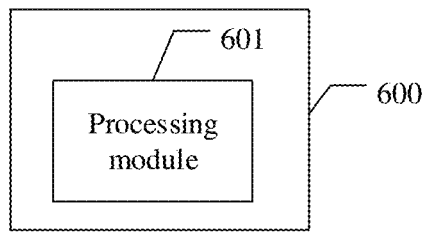
FIG. 6 is a schematic structural diagram of an optical receiver according to an embodiment of this application.

The following describes an optical receiver provided in an embodiment of this application. Refer to FIG. 6. In an embodiment of an optical receiver 600 in embodiments of this application, the optical receiver 600 is configured to perform steps performed by the optical receiver in the embodiments shown in FIG. 2A, FIG. 3, and FIG. 4, and reference may be made to related descriptions in the foregoing embodiments.

The optical receiver 600 includes a processing module 601.

The processing module 601 is configured to obtain a to-be-processed signal block.

The processing module 601 is further configured to: determine a prediction signal block corresponding to the to-be-processed signal block; determine a noise compensation coefficient of the to-be-processed signal block based on the to-be-processed signal block and the prediction signal block; and perform noise compensation on the to-be-processed signal block based on the noise compensation coefficient.

In this embodiment, the noise compensation coefficient indicates a correlation between symbols included in the to-be-processed signal block under noise interference.

In this embodiment, the processing module 601 is specifically configured to: process the to-be-processed signal block by using any one of a preset determining manner, a preset training sequence, and forward error correction FEC to obtain the prediction signal block.

In this embodiment, the to-be-processed signal block includes $R_1$ to $R_n$, and $R_1$ to $R_n$ are n symbols transmitted in a time sequence, where n is an integer greater than or equal to 2; and the processing module 601 is specifically configured to:

obtain $R_{n+1}$ to $R_{n+m-1}$, where $R_{n+1}$ to $R_{n+m-1}$ are m−1 symbols following $R_n$ that are transmitted in a time sequence; determine a first matrix and a second matrix, where the first matrix is [$S_1\ S_2\ \ldots\ S_n$], the second matrix is $$\begin{bmatrix} R_1 & R_2 & R_3 & \ldots & \ldots & R_n \\ R_2 & R_3 & R_4 & \ldots & \ldots & R_{n+1} \\ R_3 & & \ldots & & & \\ \ldots & & & \ldots & & \\ R_m & & & & & R_{n+m-1} \end{bmatrix},$$

and $S_1$ to $S_n$ are n symbols included in the prediction signal block and transmitted in a time sequence; and each column of the second matrix includes an initial symbol of the column and m−1 symbols related to the initial symbol in the to-be-processed signal block, where n is greater than m, and m is an integer greater than 1; and multiply the first matrix by an inverse matrix of the second matrix, to obtain a noise compensation matrix including the noise compensation coefficient, where the noise compensation matrix is [$h_1, h_2 \ldots h_m$].

In this embodiment, the to-be-processed signal block includes $X_1$ to $X_n$ and $Y_1$ to $Y_n$, where $X_1$ to $X_n$ are n symbols transmitted in a time sequence in a first polarization signal, and $Y_1$ to $Y_n$ are n symbols transmitted in a time sequence in a second polarization signal, where n is an integer greater than or equal to 2; and the processing module 601 is specifically configured to:

obtain $X_{n+1}$ to $X_{n+i-1}$ and $Y_{n+1}$ to $Y_{n+j-1}$, where $X_{n+1}$ to $X_{n+i-1}$ are i−1 symbols following $X_n$ that are transmitted in a time sequence in the first polarization signal, and $Y_{n+1}$ to $Y_{n+j-1}$ are j−1 symbols following $Y_n$ that are transmitted in a time sequence in the second polarization signal;

determine a first matrix and a second matrix, where the first matrix is $[S_1\ S_2\ \ldots\ S_n]$, the second matrix is $$\begin{bmatrix} X_1 & X_2 & X_3 & \ldots & \ldots & X_n \\ X_2 & X_3 & X_4 & & & X_{n+1} \\ \ldots & & \ldots & & & \\ X_i & \ldots & & & & X_{n+1-1} \\ Y_1 & Y_2 & Y_3 & \ldots & \ldots & Y_n \\ Y_2 & Y_3 & \ldots & & & \\ \ldots & & \ldots & & & \\ Y_j & & & & & Y_{n+j-1} \end{bmatrix},$$

and $S_1$ to $S_n$ are n symbols included in the prediction signal block and transmitted in a time sequence; and each column of the second matrix includes an initial symbol of the column, i−1 symbols related to the initial symbol in the first polarization signal, the $(i+1)^{th}$ symbol of the column, and j−1 symbols related to the $(i+1)^{th}$ symbol in the second polarization signal, where n is greater than i+j, i is an integer greater than 1, and j is an integer greater than 1; and multiply the first matrix by an inverse matrix of the second matrix, to obtain a noise compensation matrix including the noise compensation coefficient, where the noise compensation matrix is $[h_1, h_2 \ldots h_m]$.

In this embodiment of this application, the processing module 601 obtains a to-be-processed signal block. The processing module 601 determines a prediction signal block corresponding to the to-be-processed signal block. Then, the processing module 601 determines a noise compensation coefficient of the to-be-processed signal block based on the to-be-processed signal block and the prediction signal block, and performs noise compensation on the to-be-processed signal block based on the noise compensation coefficient. Under noise interference, there is a correlation between symbols included in the to-be-processed signal block. Therefore, the noise compensation coefficient generated by the processing module 601 based on the to-be-processed signal block and the prediction signal block can indicate the correlation between the symbols included in the to-be-processed signal block. Then, noise compensation for the to-be-processed signal block can be implemented by using the noise compensation coefficient, so as to increase a signal-to-noise ratio of a signal, and meet large-capacity and long-distance transmission performance requirements of an optical communications network.

The foregoing describes the optical receiver in the embodiment of this application from a perspective of a modular functional entity, and the following describes the optical receiver in this application from a perspective of hardware processing.

An embodiment of this application further provides an optical receiver, and the optical receiver may be a circuit.

The optical receiver may be configured to execute actions performed by the optical receiver in the foregoing method embodiments.

Figure 7:
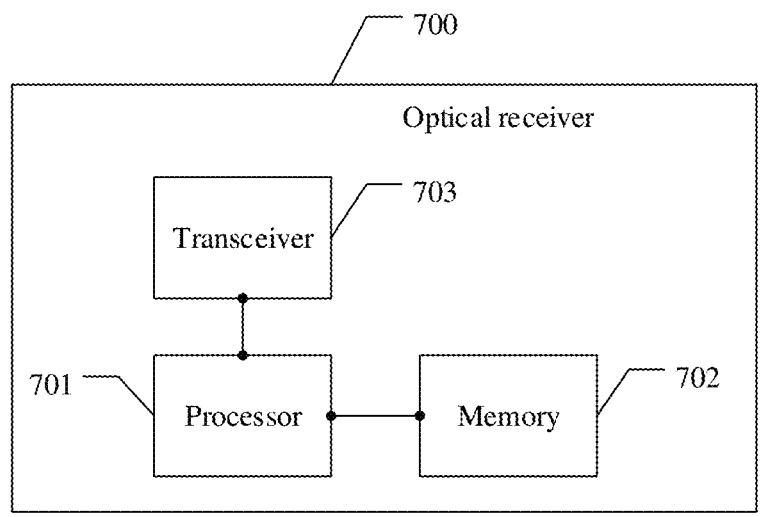
FIG. 7 is another schematic structural diagram of an optical receiver according to an embodiment of this application.

In another possible design, this application further provides an optical receiver 700. Refer to FIG. 7. A transceiver 703 is an optional component. An embodiment of the optical receiver in embodiments of this application includes: a processor 701 and a memory 702; the memory 702 stores computer instructions; and when executing the computer instructions in the memory 702, the processor 701 is configured to: obtain a to-be-processed signal block; determine a prediction signal block corresponding to the to-be-processed signal block; determine a noise compensation coefficient of the to-be-processed signal block based on the to-be-processed signal block and the prediction signal block; and perform noise compensation on the to-be-processed signal block based on the noise compensation coefficient.

In a possible implementation, the noise compensation coefficient indicates a correlation between symbols included in the to-be-processed signal block under noise interference.

In another possible implementation, the processor 701 is specifically configured to: process the to-be-processed signal block by using any one of a preset determining manner, a preset training sequence, and forward error correction FEC to obtain the prediction signal block.

In another possible implementation, the to-be-processed signal block includes $R_1$ to $R_n$, and $R_1$ to $R_n$ are n symbols transmitted in a time sequence, where n is an integer greater than or equal to 2; and the processor 701 is specifically configured to:

obtain $R_{n+1}$ to $R_{n+m-1}$, where $R_{n+1}$ to $R_{n+m-1}$ are m−1 symbols following $R_n$ that are transmitted in a time sequence;

determine a first matrix and a second matrix, where the first matrix is $[S_1\ S_2\ \ldots\ S_n]$, the second matrix is $$\begin{bmatrix} R_1 & R_2 & R_3 & \ldots & \ldots & R_n \\ R_2 & R_3 & R_4 & \ldots & \ldots & R_{n+1} \\ R_3 & & \ldots & & & \\ \ldots & & \ldots & & & \\ R_m & & & & & R_{n+m-1} \end{bmatrix},$$

and $S_1$ to $S_n$ are n symbols included in the prediction signal block and transmitted in a time sequence; and each column of the second matrix includes an initial symbol of the column and m−1 symbols related to the initial symbol in the to-be-processed signal block, where n is greater than m, and m is an integer greater than 1; and multiply the first matrix by an inverse matrix of the second matrix, to obtain a noise compensation matrix including the noise compensation coefficient, where the noise compensation matrix is $[h_1, h_2 \ldots h_m]$.

In another possible implementation, the to-be-processed signal block includes $X_1$ to $X_n$ and $Y_1$ to $Y_n$, where $X_1$ to $X_n$ are n symbols transmitted in a time sequence in a first polarization signal, and $Y_1$ to $Y_n$ are n symbols transmitted in a time sequence in a second polarization signal, where n is an integer greater than or equal to 2; and the processor 701 is specifically configured to:

obtain $X_{n+1}$ to $X_{n+i-1}$ and $Y_{n+1}$ to $Y_{n+j-1}$, where $X_{n+1}$ to $X_{n+i-1}$ are i−1 symbols following $X_n$ that are transmitted in a time sequence in the first polarization signal, and $Y_{n+1}$ to $Y_{n+j-1}$ are j−1 symbols following $Y_n$ that are transmitted in a time sequence in the second polarization signal;

determine a first matrix and a second matrix, where the first matrix is $[S_1 \ S_2 \ \ldots \ S_n]$ the second matrix is $$\begin{bmatrix} X_1 & X_2 & X_3 & \ldots & \ldots & X_n \\ X_2 & X_3 & X_4 & & & X_{n+1} \\ \ldots & & \ldots & & & \\ X_i & \ldots & & & & X_{n+1-1} \\ Y_1 & Y_2 & Y_3 & \ldots & \ldots & Y_n \\ Y_2 & Y_3 & \ldots & & & \\ \ldots & & \ldots & & & \\ Y_j & & & & & Y_{n+j-1} \end{bmatrix},$$

and $S_1$ to $S_n$ are n symbols included in the prediction signal block and transmitted in a time sequence; and each column of the second matrix includes an initial symbol of the column, i−1 symbols related to the initial symbol in the first polarization signal, the $(i+1)^{th}$ symbol of the column, and j−1 symbols related to the $(i+1)^{th}$ symbol in the second polarization signal, where n is greater than i+j, i is an integer greater than 1, and j is an integer greater than 1; and multiply the first matrix by an inverse matrix of the second matrix, to obtain a noise compensation matrix including the noise compensation coefficient, where the noise compensation matrix is $[h_1, h_2 \ldots h_m]$.

In a possible implementation, the optical receiver 700 further includes a transceiver 703, and the transceiver 703 is connected to the processor 701.

In another possible design, when the optical receiver is a chip, the chip includes at least one processor and a memory. The memory stores instructions. The processor is configured to perform an operation of the processing module 601 in FIG. 6, and/or the processor is further configured to perform another processing step of the optical receiver in the embodiment of this application.

In a possible implementation, the chip further includes a transceiver, and the transceiver is interconnected with the at least one processor through a line.

In another form of this embodiment, a computer-readable storage medium is provided, and instructions are stored on the computer-readable storage medium. When the instructions are executed, the method of the optical receiver in the foregoing method embodiment is performed.

In another form of this embodiment, a computer program product including instructions is provided. When the instructions are executed, the method of the optical receiver in the foregoing method embodiment is performed.

It should be understood that, the processor mentioned in the embodiments of this application may be a central processing unit (CPU), the processor may further be another general-purpose processor, a digital signal processor (DSP), an application specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be understood that the memory mentioned in the embodiments of this application may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA, or another programmable logic device, a discrete gate or a transistor logic device, or a discrete hardware component, the memory (storage module) is integrated into the processor.

It should be noted that the memory described in this specification includes but is not limited to these and any memory of another proper type.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method, comprising:
   obtaining, by an optical receiver, a to-be-processed signal block;
   determining, by the optical receiver, a prediction signal block corresponding to the to-be-processed signal block;
   determining, by the optical receiver, a noise compensation coefficient of the to-be-processed signal block based on the to-be-processed signal block and the prediction signal block; and
   performing, by the optical receiver, noise compensation on the to-be-processed signal block based on the noise compensation coefficient;
   wherein the to-be-processed signal block comprises $R_1$ to $R_n$ symbols, and the $R_1$ to $R_n$ symbols are n symbols transmitted in a first time sequence, and wherein n is an integer greater than or equal to 2; and
   wherein determining, by the optical receiver, the noise compensation coefficient based on the to-be-processed signal block and the prediction signal block comprises:
   obtaining, by the optical receiver, $R_{n+1}$ to $R_{n+m-1}$ symbols, wherein the $R_{n+1}$ to $R_{n+m-1}$ symbols are m−1 symbols following the $R_n$ symbol that are transmitted in a second time sequence;
   symbol that are transmitted in a second determining, by the optical receiver, a first matrix and a second matrix, wherein the first matrix is $[S_1\ S_2\ \ldots\ S_n]$, the second matrix is $$\begin{bmatrix} R_1 & R_2 & R_3 & \ldots & \ldots & R_n \\ R_2 & R_3 & R_4 & \ldots & \ldots & R_{n+1} \\ R_3 & & \ldots & & \ldots & \\ \ldots & & & & & \\ R_m & & & & & R_{n+m-1} \end{bmatrix},$$

and $S_1$ to $S_n$ symbols are n symbols comprised in the prediction signal block and transmitted in a third time sequence, and each column of the second matrix comprises an initial symbol of the respective column and m−1 symbols related to the initial symbol of the respective column in the to-be-processed signal block, and wherein n is greater than m, and m is an integer greater than 1; and
   multiplying, by the optical receiver, the first matrix by an inverse matrix of the second matrix, to obtain a noise compensation matrix comprising the noise compensation coefficient, wherein the noise compensation matrix is $[h_1, h_2, \ldots, h_m]$.

2. The method according to claim 1, wherein the noise compensation coefficient indicates a correlation between symbols comprised in the to-be-processed signal block under noise interference.

3. The method according to claim 1, wherein determining, by the optical receiver, the prediction signal block corresponding to the to-be-processed signal block comprises:
   processing, by the optical receiver, the to-be-processed signal block using any one of a preset determining manner, a preset training sequence, or forward error correction (FEC), to obtain the prediction signal block.

4. The method according to claim 3, wherein the to-be-processed signal block is processed using the preset determining manner, to obtain the prediction signal block.

5. The method according to claim 3, wherein the to-be-processed signal block is processed using the preset training sequence, to obtain the prediction signal block.

6. The method according to claim 3, wherein the to-be-processed signal block is processed using FEC, to obtain the prediction signal block.

7. An optical receiver, comprising:
   a processor and a memory;
   wherein the memory stores computer instructions; and
   wherein when executing the computer instructions in the memory, the processor is configured to:
   obtain a to-be-processed signal block;
   determine a prediction signal block corresponding to the to-be-processed signal block;
   determine a noise compensation coefficient of the to-be-processed signal block based on the to-be-processed signal block and the prediction signal block; and
   perform noise compensation on the to-be-processed signal block based on the noise compensation coefficient;
   wherein the to-be-processed signal block comprises $X_1$ to $X_n$ symbols and $Y_1$ to $Y_n$ symbols, wherein the $X_1$ to $X_1$ symbols are n symbols transmitted in a first time sequence in a first polarization signal, and the $Y_1$ to $Y_n$ symbols are n symbols transmitted in a second time sequence in a second polarization signal, wherein n is an integer greater than or equal to 2; and wherein the processor is configured to:
obtain $X_{n+1}$ to $X_{n+i-1}$ symbols and $Y_{n+1}$ to $Y_{n+j-1}$ symbols, wherein the $X_{n+1}$ to $X_{n+i-1}$ symbols are symbols following an $X_n$ symbol that are transmitted in a third time sequence in the first polarization signal, and the $Y_{n+1}$ to $Y_{n+j-1}$ symbols are j−1 symbols following $Y_n$ that are transmitted in a fourth time sequence in the second polarization signal;

determine a first matrix and a second matrix, wherein the first matrix is $[S_1 \ S_2 \ \ldots \ S_n]$, the second matrix is $$\begin{bmatrix} X_1 & X_2 & X_3 & \ldots & \ldots & X_n \\ X_2 & X_3 & X_4 & & & X_{n+1} \\ \ldots & & \ldots & & & \\ X_i & \ldots & & & & X_{n+i-1} \\ Y_1 & Y_2 & Y_3 & \ldots & \ldots & Y_n \\ Y_2 & Y_3 & \ldots & & & \\ \ldots & & \ldots & & & \\ Y_j & & & & & Y_{n+j-1} \end{bmatrix},$$

and $S_1$ to $S_n$ are n symbols comprised in the prediction signal block and transmitted in a fifth time sequence, and each column of the second matrix comprises an initial symbol of the column, i−1 symbols related to the initial symbol of the respective column in the first polarization signal, the $(i+1)^{th}$ symbol of the respective column, and j−1 symbols related to the $(i+1)^{th}$ symbol in the second polarization signal, wherein n is greater than i+j, i is an integer greater than 1, and j is an integer greater than 1; and multiply the first matrix by an inverse matrix of the second matrix, to obtain a noise compensation matrix comprising the noise compensation coefficient, wherein the noise compensation matrix is $[h_1, h_2 \ldots h_m]$.

8. The optical receiver according to claim 7, wherein the noise compensation coefficient indicates a correlation between symbols comprised in the to-be-processed signal block under noise interference.

9. The optical receiver according to claim 7, wherein the processor is configured to:
process the to-be-processed signal block using any one of a preset determining manner, a preset training sequence, or forward error correction (FEC), to obtain the prediction signal block.

10. The optical receiver according to claim 9, wherein the to-be-processed signal block is processed using FEC, to obtain the prediction signal block.

11. The optical receiver according to claim 9, wherein the to-be-processed signal block is processed using the preset determining manner, to obtain the prediction signal block.

12. The optical receiver according to claim 9, wherein the to-be-processed signal block is processed using the preset training sequence, to obtain the prediction signal block.

13. A computer program product comprising instructions stored on a non-transitory storage medium, wherein when the computer program product is run on a computer, the computer is enabled to perform the following:
obtaining a to-be-processed signal block;
determining a prediction signal block corresponding to the to-be-processed signal block;
determining a noise compensation coefficient of the to-be-processed signal block based on the to-be-processed signal block and the prediction signal block; and
performing noise compensation on the to-be-processed signal block based on the noise compensation coefficient;

wherein the to-be-processed signal block comprises $R_1$ to $R_n$ symbols, and the $R_1$ to $R_n$ symbols are n symbols transmitted in a time sequence, wherein n is an integer greater than or equal to 2; and wherein determining the noise compensation coefficient based on the to-be-processed signal block and the prediction signal block comprises:
obtaining $R_{n+1}$ to $R_{n+m-1}$ symbols, wherein the $R_{n+1}$ to $R_{n+m-1}$ symbols are m−1 symbols following an $R_n$ symbol that are transmitted in a first time sequence;

determining a first matrix and a second matrix, wherein the first matrix is $[S_1 \ S_2 \ \ldots \ S_n]$, the second matrix is $$\begin{bmatrix} R_1 & R_2 & R_3 & \ldots & \ldots & R_n \\ R_2 & R_3 & R_4 & \ldots & \ldots & R_{n+1} \\ R_3 & & \ldots & & & \\ \ldots & & & \ldots & & \\ R_m & & & & & R_{n+m-1} \end{bmatrix},$$

and $S_1$ to $S_n$ are n symbols comprised in the prediction signal block and transmitted in a second time sequence, and each column of the second matrix comprises an initial symbol of the column and m−1 symbols related to the initial symbol of the respective column in the to-be-processed signal block, wherein n is greater than m, and m is an integer greater than 1; and multiplying the first matrix by an inverse matrix of the second matrix, to obtain a noise compensation matrix comprising the noise compensation coefficient, wherein the noise compensation matrix is $[h_1, h_2 \ldots h_m]$.

14. The computer program product according to claim 13, wherein the noise compensation coefficient indicates a correlation between symbols comprised in the to-be-processed signal block under noise interference.

15. The computer program product according to claim 13, wherein determining the prediction signal block corresponding to the to-be-processed signal block comprises:
processing the to-be-processed signal block using any of a preset determining manner, a preset training sequence, or forward error correction (FEC), to obtain the prediction signal block.

16. The computer program product according to claim 15, wherein the to-be-processed signal block is processed using the preset determining manner, to obtain the prediction signal block.

17. The computer program product according to claim 15, wherein the to-be-processed signal block is processed using the preset training sequence, to obtain the prediction signal block.

18. A non-transitory computer-readable storage medium, comprising instructions, wherein when the instructions are run on a computer, the computer is enabled to perform the following:
obtaining a to-be-processed signal block;
determining a prediction signal block corresponding to the to-be-processed signal block;
determining a noise compensation coefficient of the to-be-processed signal block based on the to-be-processed signal block and the prediction signal block; and
performing noise compensation on the to-be-processed signal block based on the noise compensation coefficient;

wherein the to-be-processed signal block comprises $X_1$ to $X_n$ symbols and $Y_1$ to $Y_n$ symbols, wherein the $X_1$ to $X_n$ symbols are n symbols transmitted in a first time sequence in a first polarization signal, and the $Y_1$ to $Y_n$ symbols are n symbols transmitted in a second time sequence in a second polarization signal, wherein n is an integer greater than or equal to 2; and wherein determining the noise compensation coefficient based on the to-be-processed signal block and the prediction signal block comprises:

obtaining $X_{n+1}$ to $X_{n+i-1}$ symbols and $Y_{n+1}$ to $Y_{n+j-1}$ symbols, wherein the $X_{n+1}$ to $X_{n+i-1}$ symbols are i−1 symbols following an $X_n$ symbol that are transmitted in a third time sequence in the first polarization signal, and the $Y_{n+1}$ to $Y_{n+j-1}$ symbols are j−1 symbols following an $Y_n$ symbol that are transmitted in a fourth time sequence in the second polarization signal;

determining a first matrix and a second matrix, wherein the first matrix is $[S_1\ S_2\ \ldots\ S_n]$, the second matrix is $$\begin{bmatrix} X_1 & X_2 & X_3 & \ldots & \ldots & X_n \\ X_2 & X_3 & X_4 & & & X_{n+1} \\ \ldots & & \ldots & & & \\ X_i & \ldots & & & & X_{n+i-1} \\ Y_1 & Y_2 & Y_3 & \ldots & \ldots & Y_n \\ Y_2 & Y_3 & \ldots & & & \\ \ldots & & \ldots & & & \\ Y_j & & & & & Y_{n+j-1} \end{bmatrix},$$

and $S_1$ to $S_n$ are n symbols comprised in the prediction signal block and transmitted in a fifth time sequence, and each column of the second matrix comprises an initial symbol of the column, i−1 symbols related to the initial symbol of the respective column in the first polarization signal, the $(i+1)^{th}$ symbol of the respective column, and symbols related to the $(i+1)^{th}$ symbol in the second polarization signal, wherein n is greater than i+j, i is an integer greater than 1, and j is an integer greater than 1; and multiplying the first matrix by an inverse matrix of the second matrix, to obtain a noise compensation matrix comprising the noise compensation coefficient, wherein the noise compensation matrix is $[h_1, h_2 \ldots h_m]$.

19. The non-transitory computer-readable storage medium according to claim 18, wherein the noise compensation coefficient indicates a correlation between symbols comprised in the to-be-processed signal block under noise interference.

20. The non-transitory computer-readable storage medium according to claim 18, wherein determining the prediction signal block corresponding to the to-be-processed signal block comprises:

processing the to-be-processed signal block using any one of a preset determining manner, a preset training sequence, or forward error correction (FEC), to obtain the prediction signal block.

\* \* \* \* \*

UNITED STATES PATENT AND TRADEMARK OFFICE
CERTIFICATE OF CORRECTION

PATENT NO. : 11,870,500 B2
APPLICATION NO. : 17/645188
DATED : January 9, 2024
INVENTOR(S) : Lu et al.

Page 1 of 1

It is certified that error appears in the above-identified patent and that said Letters Patent is hereby corrected as shown below:

In the Claims

In Column 18, in Claim 1, Line 1, delete "symbol that are transmitted in a second".

In Column 18, in Claim 1, Line 26, delete "$[h_1, h_2, \ldots, h_m]$." and insert -- $[h_1, h_2, \ldots h_m]$. --.

In Column 18, in Claim 7, Line 62, delete "to $X_1$" and insert -- to $X_n$ --.

In Column 19, in Claim 7, Line 4, delete "symbols" and insert -- i–1 symbols --.

In Column 22, in Claim 18, Line 7, delete "and symbols" and insert -- and j–1 symbols --.

Signed and Sealed this
Ninth Day of April, 2024

*Katherine Kelly Vidal*
*Director of the United States Patent and Trademark Office*